(12) United States Patent
Zhu et al.

(10) Patent No.: US 9,776,882 B2
(45) Date of Patent: Oct. 3, 2017

(54) PREPARATION METHOD AND DEVICE FOR EFFICIENTLY PREPARING MAGNESIUM HYDROXIDE

(71) Applicant: DALIAN MARITIME UNIVERSITY, Dalian, Liaoning (CN)

(72) Inventors: Yimin Zhu, Liaoning (CN); Xiaojia Tang, Liaoning (CN); Lin Guo, Liaoning (CN); Quan Liu, Liaoning (CN); Chen Chen, Liaoning (CN); Tie Li, Liaoning (CN)

(73) Assignee: DALIAN MARITIME UNIVERSITY, Dalian, Liaoning (CN)

( * ) Notice: Subject to any disclaimer, the term of this patent is extended or adjusted under 35 U.S.C. 154(b) by 0 days.

(21) Appl. No.: 14/900,334

(22) PCT Filed: Jul. 26, 2013

(86) PCT No.: PCT/CN2013/080196
§ 371 (c)(1),
(2) Date: Jan. 14, 2016

(87) PCT Pub. No.: WO2014/201752
PCT Pub. Date: Dec. 24, 2014

(65) Prior Publication Data
US 2016/0145116 A1    May 26, 2016

(30) Foreign Application Priority Data

Jun. 19, 2013   (CN) .......................... 2013 1 0248358
Jun. 19, 2013   (CN) ...................... 2013 2 0354238 U

(51) Int. Cl.
*C01F 5/16*   (2006.01)
*B01J 8/00*   (2006.01)

(52) U.S. Cl.
CPC ................. *C01F 5/16* (2013.01); *B01J 8/008* (2013.01)

(58) Field of Classification Search
CPC .......................... C01F 5/14–5/22; B01J 8/008
See application file for complete search history.

(56) References Cited

U.S. PATENT DOCUMENTS

| 3,658,473 A | * | 4/1972 | Sese | .......................... | C01F 5/22 |
| | | | | | 23/304 |
| 5,143,965 A | * | 9/1992 | Mertz | ....................... | C01F 5/14 |
| | | | | | 106/461 |

(Continued)

FOREIGN PATENT DOCUMENTS

| CN | 1680191 A | 10/2005 |
| CN | 102050472 A | 5/2011 |
| JP | H08208224 A | 8/1996 |

*Primary Examiner* — Anthony J Zimmer
(74) *Attorney, Agent, or Firm* — Novick, Kim & Lee, PLLC; Allen Xue

(57) ABSTRACT

The present invention relates to a device for efficiently preparing magnesium hydroxide, comprising a material mixing tank, a coordinated pressure control unit I, a reactor, a coordinated pressure control unit II, a condenser, a three-way valve, a material storage tank, a coordinated pressure control unit III and a steam generator. A outlet of the material mixing tank is connected with one end of the coordinated pressure control unit I by a pump; the other end of the coordinated pressure control unit I is connected with an inlet of the reactor; the outlet of the reactor is connected with one end of the coordinated pressure control unit II; the other end of the coordinated pressure control unit II is connected with one end of the condenser; the other end of the condenser is connected with a first port of the three-way valve; a second port of the three-way valve is connected with a material inlet of the material mixing tank; a third port of the three-way valve is connected with the material storage tank; a steam (Continued)

inlet of the reactor is connected with one end of the coordinated pressure control unit III; and the other end of the coordinated pressure control unit III is connected with the steam generator.

6 Claims, 1 Drawing Sheet

(56) References Cited

U.S. PATENT DOCUMENTS

| | | | | |
|---|---|---|---|---|
| 5,385,671 A * | 1/1995 | Talbot | ............ | B01D 61/142 |
| | | | | 210/636 |
| 5,487,879 A * | 1/1996 | Witkowski | ............ | C01F 5/16 |
| | | | | 423/155 |
| 5,662,881 A * | 9/1997 | Higuchi | ............ | B01J 8/0095 |
| | | | | 423/636 |
| 5,906,804 A * | 5/1999 | Aral | ............ | C01F 5/14 |
| | | | | 423/265 |
| 2007/0176155 A1* | 8/2007 | Granada, Jr. | ............ | C01F 5/14 |
| | | | | 252/601 |

\* cited by examiner

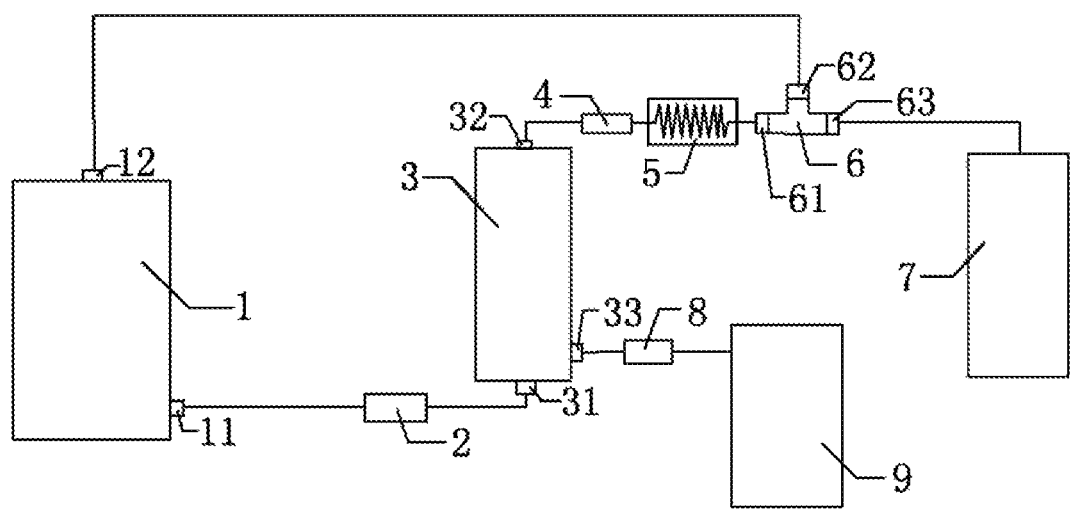

PREPARATION METHOD AND DEVICE FOR EFFICIENTLY PREPARING MAGNESIUM HYDROXIDE

TECHNICAL FIELD

The present invention relates to a preparation method and a device for efficiently preparing magnesium hydroxide.

BACKGROUND OF THE INVENTION

Magnesium hydroxide as a green material is widely applied to aspects of fireproof materials, agriculture, and environmental protection. Five kinds of ways for obtaining the magnesium hydroxide industrially are present generally: 1. the magnesium hydroxide is produced by reacting limestone with brine; 2. the magnesium hydroxide is prepared by reacting sodium hydroxide with brine and enriched bittern cakes; 3. the magnesium hydroxide is produced by reacting calcined magnesite and dolomite with brine and enriched bittern cakes; 4. the magnesium hydroxide is prepared by reacting ammonium hydroxide with brine and enriched bittern cakes; and 5. the magnesium hydroxide is generated by using hydration of magnesium oxide, wherein the magnesium oxide here must be a light-calcined product so as to ensure the hydration activity. The way of hydrating the light-calcined magnesium oxide is most commonly used to obtain the magnesium hydroxide, the hydration is finished generally under a stirring condition, and the basic conditions of hydration are as follows: the hydration temperature is 30-60° C., the concentration of the magnesium oxide slurry is 5-20% (w/w), the hydration time is 1-24 h, and the hydration ratio is 60-80%.

From the above, the problems in the technical field of preparing magnesium hydroxide by hydration of magnesium oxide are as follows: owing to longer retention time, all the traditional ways of preparing magnesium hydroxide by hydration of magnesium oxide are of an intermittent type process, the reaction vessel is relatively large in size, the hydration efficiency is not high, and the hydration ratio is relatively low.

SUMMARY OF THE INVENTION

According to the present invention, the purpose of preparing magnesium hydroxide slurry stably and efficiently is achieved by reacting magnesium oxide with steam via controlling pressure and temperature.

The present invention provides a device for efficiently preparing magnesium hydroxide, comprising a mixing tank, a pressure control linkage unit I, a reactor, a coordinated pressure control unit II, a condenser, a three-way valve, a storage tank, a coordinated pressure control unit III, and a steam generator, wherein an outlet of the mixing tank is connected with one end of the coordinated pressure control unit I through a pump; the other end of the coordinated pressure control unit I is connected with an inlet of the reactor; an outlet of the reactor is connected with one end of the coordinated pressure control unit II; the other end of the coordinated pressure control unit II is connected with one end of the condenser; the other end of the condenser is connected with a first port of the three-way valve; a second port of the three-way valve is connected with an inlet of the mixing tank; a third port of the three-way valve is connected with the storage tank; a steam inlet of the reactor is connected with one end of the coordinated pressure control unit III; and the other end of the coordinated pressure control unit III is connected with the steam generator.

According to the present invention, the coordinated pressure control unit is preferably composed of a pressure sensor and an electromagnetic valve.

In the prior art, water molecules are adsorbed to surfaces of magnesium oxide particles, and magnesium hydroxide formed by reaction covers the surfaces of the magnesium oxide particles, that impede proceeding of further hydration reaction; when the device disclosed by the present invention is used for preparing magnesium hydroxide, high-pressure steam is in direct contact with solid to generate a gas-solid reaction, magnesium hydroxide generated on the surfaces of magnesium oxide particles is stripped fast, and magnesium oxide particles are sustainably hydrated, and then obtain the magnesium hydroxide slurry after cooling.

Another objective of the present invention is to provide a preparation method for efficiently preparing magnesium hydroxide, comprising the following steps:

(1) adding magnesium oxide and water to the mixing tank and mixing uniformly to obtain magnesium oxide slurry, wherein the magnesium oxide accounts for 5-15% of the total weight;

(2) adding the magnesium oxide slurry to the reactor through the pump, starting the steam generator, introducing steam to the reactor, heating the reactor, controlling the pressure of the coordinated pressure control unit I to be 0.2-0.5 MPa, the pressure of the coordinated pressure control unit II to be 0.2-0.5 MPa, the pressure of the coordinated pressure control unit III to be 0.2-0.5 MPa, and the reaction temperature to be 90-150° C., returning liquid in reaction to the mixing tank through the second port of the three-way valve, and then returning it to the reactor from the mixing tank to form a circulation loop; and (3) circulating for 10-35 min, then closing the second port of the three-way valve, opening the third port of the three-way valve, and adding liquid obtained after reaction to the storage tank.

In the step (2) of the present invention, a feeding pressure is controlled by the coordinated pressure control unit I, steam generated by the steam generator through the coordinated pressure control unit III reacts with the magnesium oxide slurry, and drastic pressure change caused by a water hammer phenomenon during reaction is controlled by the coordinated pressure control unit II.

According to the present invention, the magnesium oxide accounts for 15% of the total weight preferably.

According to the present invention, the pressure of the coordinated pressure control unit I is 0.3-0.5 MPa preferably.

According to the present invention, the pressure of the coordinated pressure control unit II is 0.3-0.5 MPa preferably.

According to the present invention, the pressure of the coordinated pressure control unit III is 0.3-0.5 MPa preferably.

According to the present invention, the reaction temperature is 120-150° C. preferably.

The reaction conversion ratio of magnesium hydroxide reaches over 90% via the preferred ratio of the magnesium oxide, the pressure of the coordinated pressure control unit I, the pressure of the coordinated pressure control unit II, the pressure of the coordinated pressure control unit III and the reaction temperature.

The present invention has the beneficial effects:

(1) the reaction rate of preparing magnesium hydroxide is improved;

(2) the reaction conversion ratio of preparing magnesium hydroxide is improved; and (3) the size of the reactor is greatly reduced.

BRIEF DESCRIPTION OF THE DRAWINGS

The present invention has one drawing,

FIG. 1 is a structural schematic diagram of the device for efficiently preparing magnesium hydroxide;

Wherein, 1. mixing tank, 11. outlet of the mixing tank, 12. inlet of the mixing tank, 2. coordinated pressure control unit I, 3. reactor, 31. inlet of the reactor, 32. outlet of the reactor, 33. steam inlet of the reactor, 4. coordinated pressure control unit II, 5. the condenser, 6. three-way valve, 61. first port of the three-way valve, 62. second port of the three-way valve, 63. third port of the three-way valve, 7. storage tank, 8. coordinated pressure control unit III, 9. steam generator 9.

DETAILED DESCRIPTION OF THE PREFERRED EMBODIMENTS OF THE INVENTION

The following nonrestrictive embodiments can be provided for that ordinary person skilled in the art to understand the present invention more comprehensively rather than limiting the present invention in any way.

Embodiment 1

A device for efficiently preparing magnesium hydroxide, comprises a mixing tank 1, a coordinated pressure control unit I 2, a reactor 3, a coordinated pressure control unit II 4, a condenser 5, a three-way valve 6, a storage tank 7, a coordinated pressure control unit III 8, and a steam generator 9, wherein an outlet 11 of the mixing tank is connected with one end of the coordinated pressure control unit I 2 through a pressure pump; the other end of the coordinated pressure control unit I 2 is connected with an inlet 31 of the reactor; an outlet 32 of the reactor is connected with one end of the coordinated pressure control unit II 4; the other end of the coordinated pressure control unit II 4 is connected with one end of the condenser 5; the other end of the condenser 5 is connected with a first port 61 of the three-way valve; a second port 62 of the three-way valve is connected with an inlet 12 of the mixing tank; a third port 63 of the three-way valve is connected with the storage tank 7; a steam inlet 33 of the reactor is connected with one end of the coordinated pressure control unit III 8; the other end of the coordinated pressure control unit III 8 is connected with the steam generator 9; and the coordinated pressure control unit is composed of a pressure sensor and an electromagnetic valve.

A preparation method for efficiently preparing magnesium hydroxide, comprises the following steps:

(1) adding magnesium oxide and water to the mixing tank 1 and mixing uniformly to obtain magnesium oxide slurry, wherein the magnesium oxide accounts for 5% of the total weight;

(2) adding the magnesium oxide slurry to the reactor 3 through the pump, starting the steam generator 9, introducing steam to the reactor 3, and heating the reactor 3, controlling the pressure of the coordinated pressure control unit I 2 to be 0.2-0.3 MPa, the pressure of the coordinated pressure control unit II 4 to be 0.2-0.3 MPa, and the pressure of the coordinated pressure control unit III 8 to be 0.2-0.3 MPa, raising the reaction temperature to 90-120° C., returning liquid in reaction to the mixing tank 1 through the second port 62 of the three-way valve, and then returning it to the reactor 3 from the mixing tank 1 to form a circulation loop, wherein the circulation flow is 1.95 L/min; and (3) circulating for 35 min, then closing the second port 62 of the three-way valve, opening the third port 63 of the three-way valve, and adding liquid obtained after reaction to the storage tank 7.

The test result of Embodiment 1 is showed in Table 1:

TABLE 1

| Hydration ratio of Embodiment 1 | | | | | | |
|---|---|---|---|---|---|---|
| | Reaction Time (min) | | | | | |
| | 10 | 15 | 20 | 25 | 30 | 35 |
| Hydration Ratio (%) | 57.8 | 59.2 | 54.3 | 58.4 | 56.5 | 59.1 |

Embodiment 2

The difference with Embodiment 1 lies in that:

a preparation method for efficiently preparing magnesium hydroxide, comprises the following steps:

(1) adding magnesium oxide and water to the mixing tank 1 and mixing uniformly to obtain magnesium oxide slurry, wherein the magnesium oxide accounts for 5% of the total weight;

(2) adding the magnesium oxide slurry to the reactor 3 through the pump, starting the steam generator 9, introducing steam to the reactor 3, and heating the reactor 3, controlling the pressure of the coordinated pressure control unit I 2 to be 0.3-0.5 MPa, the pressure of the coordinated pressure control unit II 4 to be 0.3-0.5 MPa, and the pressure of the coordinated pressure control unit III 8 to be 0.3-0.5 MPa, raising the reaction temperature to 120-150° C., returning liquid in reaction to the mixing tank 1 through the second port 62 of the three-way valve, and then returning it to the reactor 3 from the mixing tank 1 to form a circulation loop, wherein the circulation flow is 1.55 L/min; and (3) circulating for 35 min, then closing the second port 62 of the three-way valve, opening the third port 63 of the three-way valve, and adding liquid obtained after reaction to the storage tank 7.

The test result of Embodiment 2 is showed in Table 2:

TABLE 2

| Hydration ratio of Embodiment 2 | | | | | | |
|---|---|---|---|---|---|---|
| | Reaction Time (min) | | | | | |
| | 10 | 15 | 20 | 25 | 30 | 35 |
| Hydration Ratio (%) | 55.8 | 57.4 | 53.9 | 58.2 | 56.3 | 59.4 |

Embodiment 3

The difference with Embodiment 1 lies in that:

A preparation method for efficiently preparing magnesium hydroxide, comprises the following steps:

(1) adding magnesium oxide and water to the mixing tank 1 and mixing uniformly to obtain magnesium oxide slurry, wherein the magnesium oxide accounts for 10% of the total weight;

(2) adding the magnesium oxide slurry to the reactor 3 through the pump, starting the steam generator 9, introducing steam to the reactor 3, and heating the reactor 3, controlling the pressure of the coordinated pressure control unit I 2 to be 0.2-0.3 MPa, the pressure of the coordinated pressure control unit II 4 to be 0.2-0.3 MPa, and the pressure of the coordinated pressure control unit III 8 to be 0.2-0.3 MPa, raising the reaction temperature to be 90-120° C., returning liquid in reaction to the mixing tank 1 through the second port 62 of the three-way valve, and then returning it to the reactor 3 from the mixing tank 1 to form a circulation loop, wherein the circulation flow is 1.2 L/min; and (3) circulating for 35 min, then closing the second port 62 of the three-way valve, opening the third port 63 of the three-way valve, and adding liquid obtained after reaction to the storage tank 7.

The test result of Embodiment 3 is showed in Table 3:

TABLE 3

Hydration ratio of Embodiment 3

| | Reaction Time (min) | | | | | |
|---|---|---|---|---|---|---|
| | 10 | 15 | 20 | 25 | 30 | 35 |
| Hydration Ratio (%) | 82.5 | 83.1 | 81.7 | 83.9 | 82.0 | 83.4 |

Embodiment 4

The difference with Embodiment 1 lies in that:

A preparation method for efficiently preparing magnesium hydroxide, comprises the following steps:

(1) adding magnesium oxide and water to the mixing tank 1 and mixing uniformly to obtain magnesium oxide slurry, wherein the magnesium oxide accounts for 10% of the total weight;

(2) adding the magnesium oxide slurry to the reactor 3 through the pump, starting the steam generator 9, introducing steam to the reactor 3, heating the reactor 3, controlling the pressure of the coordinated pressure control unit I 2 to be 0.3-0.5 MPa, the pressure of the coordinated pressure control unit II 4 to be 0.3-0.5 MPa, and the pressure of the coordinated pressure control unit III 8 to be 0.3-0.5 MPa, raising the reaction temperature to be 120-150° C., returning liquid in reaction to the mixing tank 1 through the second port 62 of the three-way valve, and then returning it to the reactor 3 from the mixing tank 1 to form a circulation loop, wherein the circulation flow is 2.9 L/min; and (3) circulating for 35 min, then closing the second port 62 of the three-way valve, opening the third port 63 of the three-way valve, and adding liquid obtained after reaction to the storage tank 7.

The test result of Embodiment 4 is showed in Table 4:

TABLE 4

Hydration ratio of Embodiment 4

| | Reaction Time (min) | | | | | |
|---|---|---|---|---|---|---|
| | 10 | 15 | 20 | 25 | 30 | 35 |
| Hydration Ratio (%) | 83.7 | 82.6 | 84.7 | 83.4 | 84.9 | 82.1 |

Embodiment 5

The difference with Embodiment 1 lies in that:

a preparation method for efficiently preparing magnesium hydroxide, comprises the following steps:

(1) adding magnesium oxide and water to the mixing tank 1 and mixing uniformly to obtain magnesium oxide slurry, wherein the magnesium oxide accounts for 15% of the total weight;

(2) adding the magnesium oxide slurry to the reactor 3 through the pump, starting the steam generator 9, introducing steam to the reactor 3, heating the reactor 3, controlling the pressure of the coordinated pressure control unit I 2 to be 0.2-0.3 MPa, the pressure of the coordinated pressure control unit II 4 to be 0.2-0.3 MPa and the pressure of the coordinated pressure control unit III 8 to be 0.2-0.3 MPa, raising the reaction temperature to be 90-120° C., returning liquid in reaction to the mixing tank 1 through the second port 62 of the three-way valve, and then returning it to the reactor 3 from the mixing tank 1 to form a circulation loop, wherein the circulation flow is 3.1 L/min; and (3) circulating for 35 min, then closing the second port 62 of the three-way valve, opening the third port 63 of the three-way valve, and adding liquid obtained after reaction to the storage tank 7.

The test result of Embodiment 5 is showed in Table 5:

TABLE 5

Hydration ratio of Embodiment 5

| | Reaction Time (min) | | | | | |
|---|---|---|---|---|---|---|
| | 10 | 15 | 20 | 25 | 30 | 35 |
| Hydration Ratio (%) | 91.4 | 93.6 | 92.3 | 92.8 | 91.5 | 92.4 |

Embodiment 6

The difference with Embodiment 1 lies in that:

a preparation method for efficiently preparing magnesium hydroxide comprises the following steps:

(1) adding magnesium oxide and water to the mixing tank 1 and mixing uniformly to obtain magnesium oxide slurry, wherein the magnesium oxide accounts for 15% of the total weight;

(2) adding the magnesium oxide slurry to the reactor 3 through the pump, starting the steam generator 9, introducing steam to the reactor 3, heating the reactor 3, controlling the pressure of the coordinated pressure control unit I 2 to be 0.3-0.5 MPa, the pressure of the coordinated pressure control unit II 4 to be 0.3-0.5 MPa and the pressure of the coordinated pressure control unit III 8 to be 0.3-0.5 MPa, raising the reaction temperature to be 120-150° C., returning liquid in reaction to the mixing tank 1 through the second port 62 of the three-way valve, and then returning it to the reactor 3 from the mixing tank 1 to form a circulation loop, wherein the circulation flow is 2.75 L/min; and (3) circulating for 35 min, then closing the second port 62 of the three-way valve, opening the third port 63 of the three-way valve, and adding liquid obtained after reaction to the storage tank 7.

The test result of Embodiment 6 is showed in Table 6:

TABLE 6

Hydration ratio of Embodiment 6

| | Reaction Time (min) | | | | |
|---|---|---|---|---|---|
| 10 | 15 | 20 | 25 | 30 | 35 |
| Hydration Ratio (%) 90.1 | 92.5 | 95.4 | 93.7 | 93.5 | 95.1 |

Test Conclusions:

(1) by the adoption of the method for preparing magnesium hydroxide in the present invention, the reaction conversion ratio at 10 min tends to be stable, and the reaction conversion ratio after 10 min less changes with time; and (2) when the percentage concentration by mass of magnesium oxide is 10-15%, the reaction conversion ratio at 10 min reaches 80-90%.

Contrast Test 1

A jar test is adopted in contrast to the test of the present invention;

The test conditions of Contrast test 1 is showed in Table 7.

TABLE 7

Test conditions of Contrast test 1

| | Percentage Concentration by Mass of Magnesium Oxide | Reaction Temperature | Stirring Rate |
|---|---|---|---|
| Contrast test 1 | 10% | 90° C. | 900 r/min |

The test results of Contrast test 1 is showed in Table 8.

TABLE 8

Test Results of Contrast test 1

| | Reaction Time (min) | | | | | | | |
|---|---|---|---|---|---|---|---|---|
| | 10 | 20 | 30 | 40 | 50 | 60 | 90 | 120 |
| Hydration Ratio (%) | 47.1 | 52.0 | 56.7 | 65.1 | 66.0 | 70.0 | 72.8 | 77.7 |

Conclusion: when the hydration time of a jar test is 120 min, the reaction conversion ratio of magnesium oxide is only 77.7%; according to the preparation method disclosed by the present invention, under the same reaction temperature, over 80% reaction conversation ratio can be obtained after 10 min reaction, and therefore, compared with the traditional method, the present invention has the remarkable advantages of quickly and efficiently; and meanwhile, the reaction ratio is shortened, so that the occupied area of the device disclosed by the present invention is greatly reduced compared with that of a traditional device.

The invention claimed is:

1. A preparation method for magnesium hydroxide in a reaction apparatus, the reaction apparatus comprises a mixing tank, a coordinated pressure control unit I, a pump, a reactor, a coordinated pressure control unit II, a condenser, a three-way valve, a storage tank, a coordinated pressure control unit III, and a steam generator, wherein an outlet of the mixing tank is connected to the pump, the pump is connected to a first end of the coordinated pressure control unit I, a second end of the coordinated pressure control unit I is connected to an inlet of the reactor, an outlet of the reactor is connected to a first end of the coordinated pressure control unit II, a second end of the coordinated pressure control unit II is connected to an inlet of the condenser, an outlet of the condenser is connected to a first port of the three-way valve, a second port of the three-way valve is connected to an inlet of the mixing tank, a third port of the three-way valve is connected to the storage tank, a steam inlet of the reactor is connected to a first end of the coordinated pressure control unit III, and a second end of the coordinated pressure control unit III is connected to the steam generator, the method comprising:

(1) mixing magnesium oxide and water in the mixing tank to obtain a magnesium oxide slurry, wherein the magnesium oxide accounts for 5-15% of a total weight of the slurry;

(2) transferring the magnesium oxide slurry to the reactor using the pump, generating steam in the steam generator, and introducing the steam into the reactor and heating the reactor to 90-150° C., controlling the pressure of the coordinated pressure control unit I at 0.2-0.5 MPa, and the coordinated pressure control unit II at 0.2-0.5 MPa, and the pressure of the coordinated pressure control unit III at 0.2-0.5 MPa, and feeding a fluid from the outlet of the reactor to the inlet of the mixing tank, passing successively the coordinated control unit II, the condenser, and the three-port valve so as to circulate the fluid between the reactor and the mixing tank; and (3) circulating the fluid for 10-35 minutes, and directing the fluid to the storage tank.

2. The preparation method according to claim 1, wherein the magnesium oxide accounts for 15% of the total weight of the slurry.

3. The preparation method according to claim 1, wherein the pressure of the coordinated pressure control unit I is 0.3-0.5 MPa.

4. The preparation method according to claim 1, wherein the pressure of the coordinated pressure control unit II is 0.3-0.5 MPa.

5. The preparation method according to claim 1, wherein the pressure of the coordinated pressure control unit III is 0.3-0.5 MPa.

6. The preparation method according to claim 1, wherein the reactor is heated to 120-150° C.

* * * * *